(12) United States Patent
Nakane

(10) Patent No.: US 6,999,207 B2
(45) Date of Patent: Feb. 14, 2006

(54) IMAGE PROCESSING APPARATUS, IMAGE FORMING APPARATUS, AND METHOD OF THEM

(75) Inventor: Naomi Nakane, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 841 days.

(21) Appl. No.: 09/955,087

(22) Filed: Sep. 19, 2001

(65) Prior Publication Data
US 2003/0053145 A1 Mar. 20, 2003

(51) Int. Cl.
*H04N 1/04* (2006.01)

(52) U.S. Cl. .................. 358/474; 358/1.2; 358/1.9; 358/504

(58) Field of Classification Search ................ 358/474, 358/1.2, 1.9, 504, 501, 537, 406, 448, 452
See application file for complete search history.

(56) References Cited

U.S. PATENT DOCUMENTS

| | | | | |
|---|---|---|---|---|
| 5,373,371 A | * | 12/1994 | Masui | 358/444 |
| 6,750,989 B1 | * | 6/2004 | Kamada et al. | 358/488 |
| 2001/0046322 A1 | * | 11/2001 | Saiga | 382/198 |
| 2002/0076106 A1 | * | 6/2002 | Kondo et al. | 382/194 |
| 2002/0080336 A1 | * | 6/2002 | Kamada et al. | 355/52 |
| 2003/0197894 A1 | * | 10/2003 | Miyamoto et al. | 358/1.18 |

FOREIGN PATENT DOCUMENTS

JP 9-200496 7/1997

* cited by examiner

*Primary Examiner*—Kimberly Williams
*Assistant Examiner*—Negussie Worku
(74) *Attorney, Agent, or Firm*—Foley & Lardner LLP

(57) ABSTRACT

The present invention provides an image forming apparatus includes a scanner unit which scans a plurality of photographic images and which outputs image information upon receiving instruction of automatic edit processing, an extracting unit which extracts a position and a size of each of the plurality of photographic images, an image editing unit which outputs an edit image, in which the plurality of photographic images are laid out within a predetermined layout, on the basis of the position and the size of each of the plurality of photographic images, and a printer unit which prints the edit image on an image forming medium. According to the present invention, scanning a plurality of photographs at the same time allows a photograph album to be automatically printed out.

4 Claims, 7 Drawing Sheets

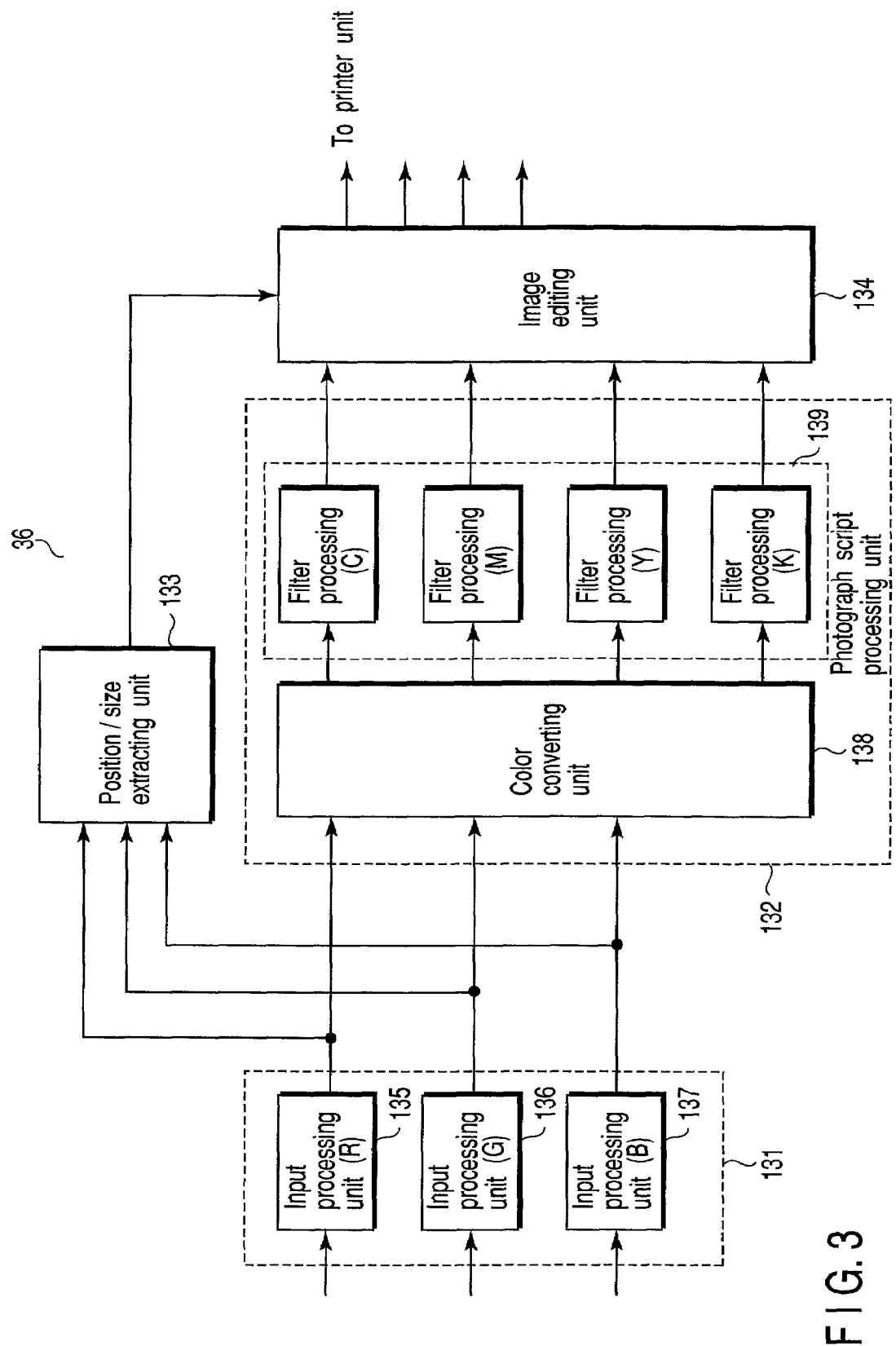
F I G. 3

(a) Case that there are two sheets of photographs (b) Case that there are three sheets of photographs (c) Case that there are four sheets of photographs (d) Case that there are five sheets of photographs

IMAGE PROCESSING APPARATUS, IMAGE FORMING APPARATUS, AND METHOD OF THEM

BACKGROUND OF THE INVENTION

In recent years, a copying machine having a developing paper photograph mode as one of script modes makes up the majority of a full color copying machine. Upon copying a developing paper photograph such as a snapshot or the like by such a full color copying machine, the photographs are simply laid out on a script table to be copied, or if the photograph is a standard size, it is enlarged to a size of an output paper by a standard variable power to be copied.

However, even if a user intends to copy a snapshot and a photograph in an infinite form in this developing paper photograph mode, the photographs are simply laid out on a script table, so that the layout becomes monotonous or unnatural spaces are produced. As a result, the copied photographs often look sluggish.

Alternatively, in the case of producing a simple photo album, this involves a problem such that complicated work is needed such that the outputted copy samples are cut by hand to be relocated and an illustration and an ornament are added in order to make a fine show of the photographs. Further, this involves a problem such that an image quality is deteriorated due to generation copy since the photographs should be copied time and again.

In this point, for example, Japanese Patent Application KOKAI Publication No. 9-200496 discloses a technical art such that a well balanced and artistic layout is capable of being printed without troubling an operator even when image data having different aspect ratio is allocated to a frame having a predetermined aspect ratio.

However, even this technical art involves a problem such that the user must set many functions and it is not possible to automatically and easily provide an optimum layout of a plurality of photographic images.

BRIEF SUMMARY OF THE INVENTION

An object of the present invention is to provide an image processing apparatus, an image forming apparatus, an image processing method, and an image forming method which improve convenience of a developing paper photograph mode by adding an automatic size detecting function and an automatic layout function to a developing paper photograph mode of a full color copying machine.

The present invention provides an image forming apparatus comprising a scanner unit which scans a plurality of photographic images and which outputs image information upon receiving instruction of automatic edit processing; an extracting unit which extracts a position and a size of each of the plurality of photographic images; and an image editing unit which outputs edit image, in which the plurality of photographic images are laid out within a predetermined layout, on the basis of the position and the size of each of the plurality of photographic images.

According to the image processing apparatus of the present invention, owing to scanning a plurality of photographs having different sizes, positions, sizes and the like of the photographs are automatically detected on the side of the copying machine, so that the photographs are automatically arranged in a predetermined layout to be printed out. Accordingly, a user can easily obtain an edit image for printing out a photo album appropriately arranged only by operating the copying machine so as to designate a mode and scan the plural photographs arranged on the script table, so that the user is capable of supplying this edit image to a printer unit to print out the photo album.

BRIEF DESCRIPTION OF THE SEVERAL VIEWS OF THE DRAWING

FIG. 3 is a block diagram for illustrating an embodiment of an image processing unit according to the present invention;

DETAILED DESCRIPTION OF THE INVENTION

An embodiment according to the present invention will be explained with reference to the drawings below.

<Image Forming Apparatus According to the Present Invention>

At first, an example of an image forming apparatus, in which the present invention is used, will be explained with reference to the drawings.

Figure 1:
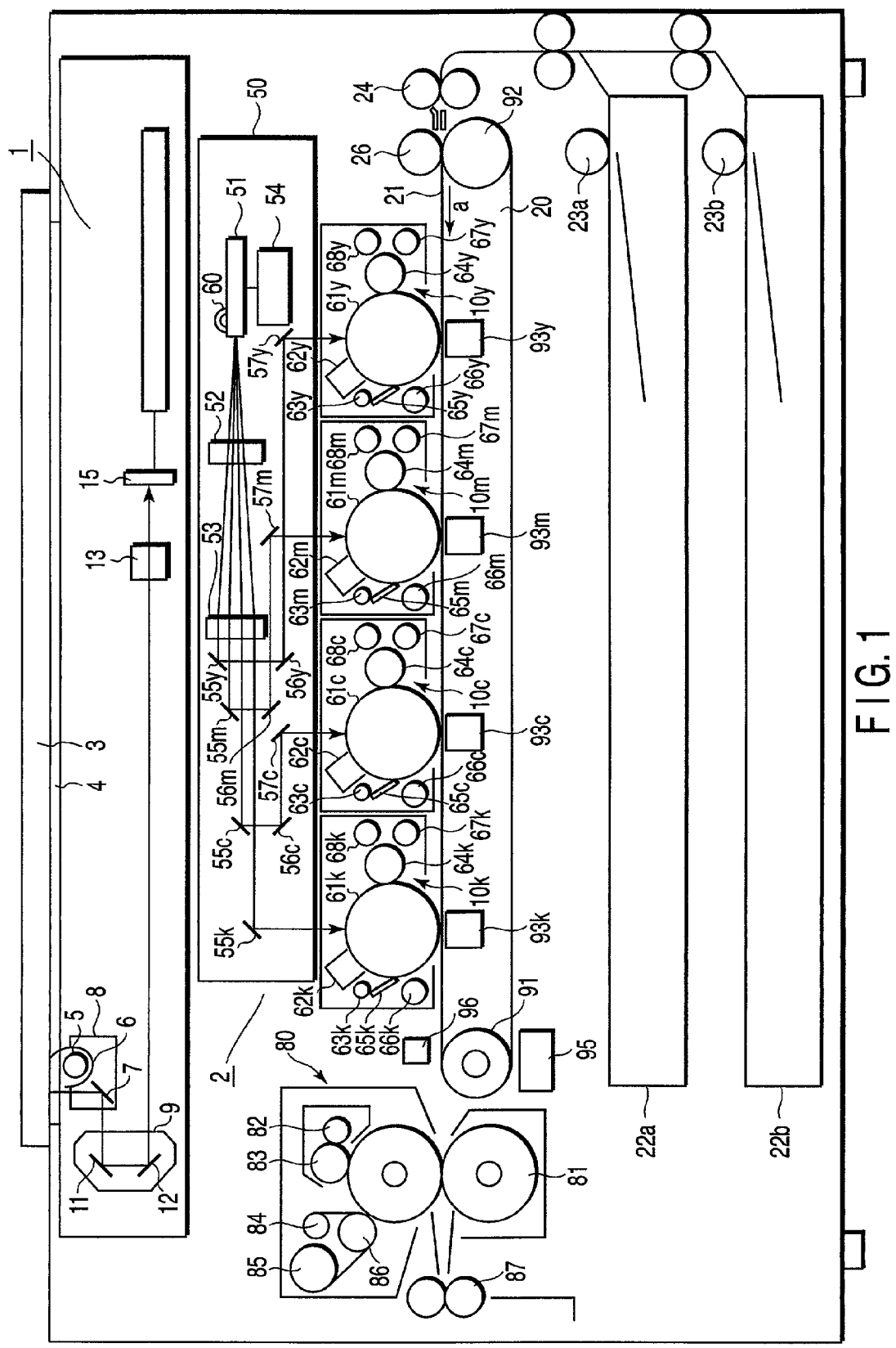
FIG. 1 is a sectional view for illustrating a schematic structure of a digital color copying machine to explain one embodiment of the present invention.

FIG. 1 schematically illustrates an inner structure of the image forming apparatus according to the present invention such as a digital system color copying machine or the like to form a repro image of a color image. This image forming apparatus is roughly composed of a color scanner unit 1 as image reading means to read a color image on a script and a color printer unit 2 as image forming means to form a repro image of the read color image.

The color scanner unit 1 has a script table cover 3 on its upper portion. The color scanner unit 1 is arranged opposite to an unopened script table cover 3 and has a script table 4 composed of a transparent glass on which the script is set. Down below of the script table 4, an exposure lamp 5 to illuminate the script laid on the script table 4, a reflector 6 to collect the light from the exposure lamp 5 on the script and a first mirror 7 to bend the reflection light from the script in a left direction with respect to the drawing, and the like are arranged. Further, the exposure lamp 5, the reflector 6 and the first mirror 7 are fixed on a first carriage 8. If the first carriage 8 is driven by a pulse motor (not illustrated), it is moved in parallel along a lower face of the script table 4.

In a left direction with respect to the first carriage 8, namely, in a direction to which the light reflected by the first mirror 7 is guided, a second carriage 9 provided movably in parallel with the script table 4 via an unillustrated driving mechanism (for example, a toothed belt, a direct current motor or the like), is arranged. In the second carriage 9, a second mirror 11 to bend the reflection light from the script guided by the first mirror 7 downward in the drawing and a third mirror 12 to bend the reflection light from the second mirror 11 in the right direction in the drawing are laid perpendicular to each other. The second carriage 9 is driven by the first carriage 8 as well as it is moved in parallel with the first carriage 8 along the script table 4 by a half speed.

On a face including a light axis of a light folded by the second and third mirrors 11, 12, an imaging lens 13 to image the reflection light from the third mirror 12 by a predetermined multiplying power is laid. On a face substantially orthogonal to the light axis of the light passed through the imaging lens 13, a CCD type color image sensor (a photoelectric converting element) 15 is provided to convert the reflection light provided with convergence by the image lens 13 into an electric signal.

Thus, if the light from the exposure lamp 5 is converged on the script of the script table 4 by the reflector 6, the reflection light from the script is inputted in the color image sensor 15 via the first mirror 7, the second mirror 11, the third mirror 12 and the image lens 13. Then, the inputted reflection light is converted to electric signals in association with three primary colors of a light, namely, R (red), G (green) and B (blue) in the color image sensor 15.

The color printer unit 2 has images in which color separation is carried out by each color component, namely, first to fourth image forming units 10Y, 10M, 10C and 10K to form the images of four colors, i.e., yellow (Y), magenta (M), cyanogen (C) and black (K), respectively, on the basis of a well known subtractive color mixed process.

Down below respective image forming units 10Y, 10M, 10C and 10K, a feeding mechanism 20 including a feeding belt 21 as feeding means to feed an image of each color formed by each image forming unit in a direction represented by an arrow A in the drawing is arranged. The feeding belt 21 is winded and stretched between a driving roller 91 rotated in the direction of the arrow A by a motor (not illustrated), and a driven roller 92 estranged by a predetermined distance from the driving roller 91, and then, the feeding belt 21 endlessly travels in the direction of the arrow A with a predetermined speed. Alternatively, respective image forming units 10Y, 10M, 10C and 10K are laid in series with the feeding direction of the feeding belt 21.

Respective image forming units 10Y, 10M, 10C and 10K include photo conductor drums 61Y, 61M, 61C and 61K whose outer periphery is formed rotatably in the same direction at a position contacting with the feeding belt 21, respectively, as an image catalyst support. The respective photo conductor drums 61Y, 61M, 61C and 61K are rotated with a predetermined speed by a motor (not illustrated). The respective photo conductor drums 61Y, 61M, 61C and 61K are laid so that the axial lines thereof are at even intervals each other as well as their axial lines are arranged so as to be orthogonal to the direction to which the image is fed by the feeding belt 21. Alternatively, in the following explanation, the axial directions of the respective photo conductor drums 61Y, 61M, 61C and 61K are determined as a main scanning direction (a second direction) and the rotational directions of the photo conductor drums 61Y, 61M, 61C and 61K, namely, a rotational direction of the feeding belt 21 (the arrow A direction in the drawing) are determined as a sub scanning direction (a first direction).

Around the respective photo conductor drums 61Y, 61M, 61C and 61K, charging devices 62Y, 62M, 62C and 62K as charging means elongated in the main scanning direction, electricity removal devices 63Y, 63M, 63C and 63K, developing rollers 64Y, 64M, 64C and 64K as developing means elongated in the main scanning direction in the same way, lower stirring rollers 67Y, 67M, 67C and 67K, upper stirring rollers 68Y, 68M, 68C and 68K, transfer printing devices 93Y, 93M, 93C and 93K as transfer printing means elongated in the main scanning direction in the same way, cleaning blades 65Y, 65M, 65C and 65K elongated in the main scanning direction in the same way and exhaust toner collecting screws 66Y, 66M, 66C and 66K are located in sequence along the rotational directions of the photo conductor drums 61Y, 61M, 61C and 61K, respectively.

Alternatively, the respective transfer printing devices 93Y, 93M, 93C and 93K are laid in a position to clip the feeding belt 21 between the corresponding photo conductor drums 61Y, 61M, 61C and 61K, namely, in the inside of the feeding belt 21. Additionally, exposure points of an exposure device 50 to be described later are formed on the outer peripherals of the photo conductor drums 61Y, 61M, 61C and 61K between the charging devices 62Y, 62M, 62C and 62K and the developing rollers 64Y, 64M, 64C and 64K, respectively.

Down below the feeding mechanism 20, paper stock cassettes 22A and 22B to contain plural sheets of paper P as an image formed medium which transcribes the images formed by respective image forming units 10Y, 10M, 10C and 10K are located.

Pick up rollers 23A and 23B to pick up the paper P contained in the paper stock cassettes 22A and 22B from the top thereof one by one are arranged on one end of the paper stock cassettes 22A and 22B, namely, on the side adjacent to the driven roller 92. Between the pick up rollers 23A and 23B and the driven roller 92, a register roller 24 is arranged to match a front end of the paper P taken out from the paper cassettes 22A and 22B and a front end of a Y toner image formed on the photo conductor drum 61Y of the image forming unit 10Y.

Alternatively, the toner images formed on other photo conductor drums 61M, 61C and 61K are supplied to the respective transcription positions in conformity with a feeding timing of the paper P fed on the feeding belt 21.

An absorption roller 26 is laid between the resist roller 24 and the first image forming unit 10Y and in the vicinity of the driven roller 92, namely, on the outer peripheral of the driven roller 92 with substantially interleaving the feeding belt 21 to provide the electrostatic adsorbability to the paper P to be fed at a predetermined timing via the resist roller 24. Alternatively, an axis line of an absorption roller 26 and an axial line of the driven roller 92 are set so as to be in parallel with each other.

A displacement sensor 96 is laid on one end of the feeding belt 21 and in the vicinity of the driving roller 91, namely, on the outer peripheral of the driving roller 91 with substantially interleaving the feeding belt 21 to detect a position of the image formed on the feeding belt 21.

The displacement sensor 96 is configured by, for example, an optical sensor of a transmission type or a reflection. A feeding belt cleaning apparatus 95 is laid on the outer periphery of the driving roller 91 and on the feeding belt 21 on the downstream of the displacement sensor 96 to remove the toner attached on the feeding belt 21 or paper grounds of the paper P.

A fixing apparatus 80 is laid in a direction such that the paper P fed via the feeding belt 21 is removed from the driving roller 91 to be further fed to fuse the toner image transcribed on the paper P by heating up the paper P to a predetermined temperature and fix the toner image on the paper P. The fixing apparatus 80 is configured by a pair of heat rollers 81, oil applying rollers 82 and 83, a web winding roller 84, a web roller 85 and a web pressing roller 86. Then, the toner for the use of the paper P is fixed on the paper to be discharged by a pair of discharging rollers 87.

The exposure device 50 to form the electrostatic latent images in which color separation is carried out, respectively, on the outer periphery of the respective photo conductor drums 61Y, 61M, 61C and 61K has a semiconductor laser oscillator 60 whose illumination is controlled on the basis of the image data (Y, M, C, K) for each color, in which color separation is carried out by an image processing unit 36 to be described later. On a light path of the semiconductor laser oscillator 60, a polygon mirror 51 rotated by a polygon motor 54 to reflect and scan the laser beam light and F Θ lenses 52 and 53 to correct a focal point of the laser beam light reflected via the polygon mirror 51, and image it are provided in sequence. Between the F Θ lens 53 and the respective photo conductor drums 61Y, 61M, 61C and 61K, first folding back mirrors 55Y, 55M, 55C and 55K which fold back the laser beam lights for each color passed through the F Θ lens 53 toward the exposure positions of respective photo conductor drums 61Y, 61M, 61C and 61K, and second and third folding back mirrors 56Y, 56M, 56C, 57Y, 57M and 57C which further fold back the laser beam lights, which are folded back by the first folding back mirrors 55Y, 55M and 55C are arranged.

Alternatively, the laser beam light for black is folded back by the folding back mirror 55K, then, it is guided on the photo conductor drum 61K not via other mirror.

Figure 2:
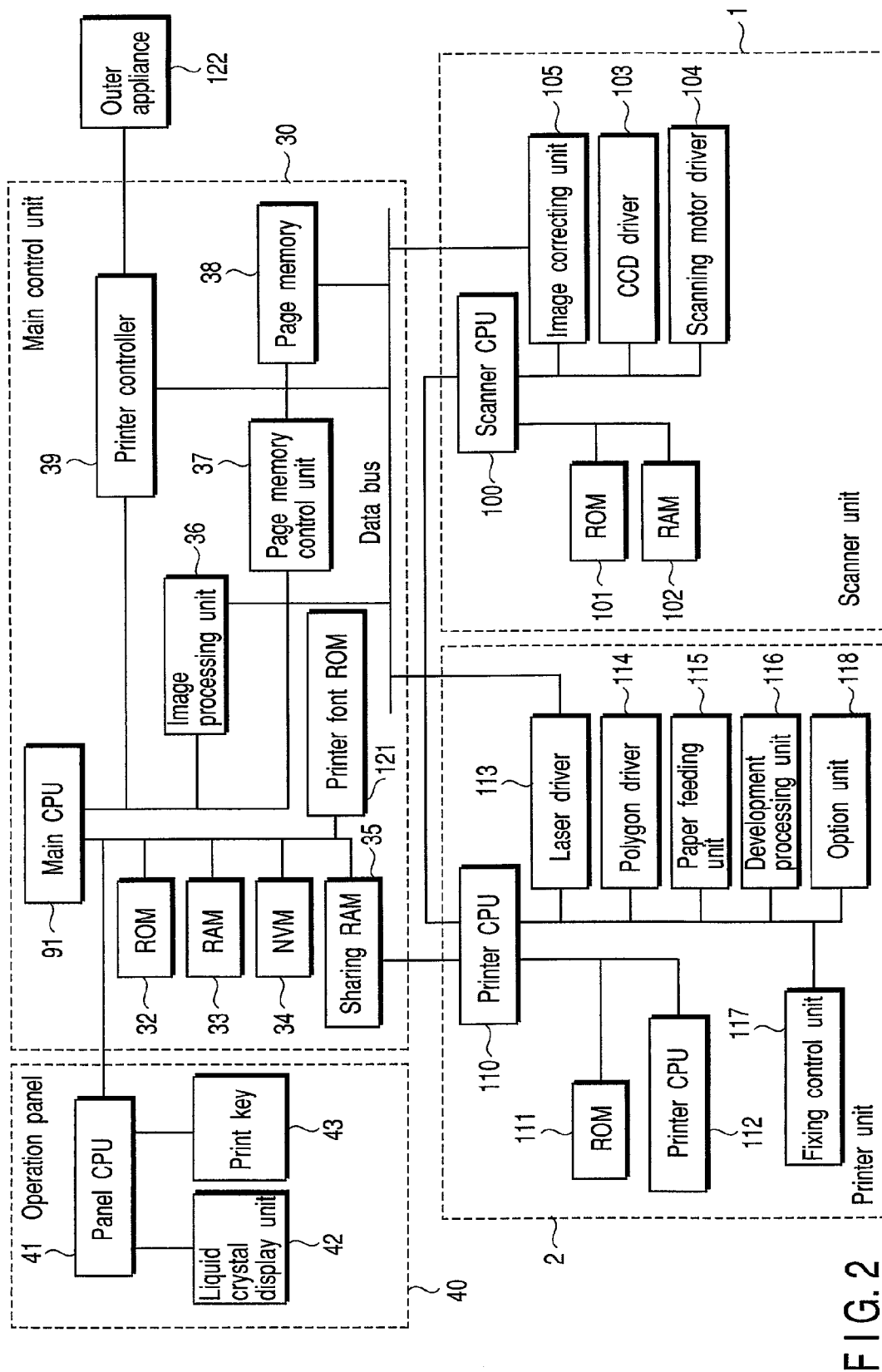
FIG. 2 is a block diagram for illustrating a control system of the digital color copying machine shown in FIG. 1.

FIG. 2 is a block diagram for schematically illustrating a signal flow to electrically connect and control a digital copying machine shown in FIG. 1. In FIG. 2, a control system is configured by three CPUs, namely, a main CPU (a central processing unit) 91 in a main control unit 30, a scanner CPU 100 of the color scanner unit 1 and a printer CPU 11 of a color printer unit 2. The main CPU 91 performs bidirectional communication via a printer CPU 110 and a sharing RAM (random access memory) 35. Further, the main CPU 91 issues an operation instruction and the printer CPU 110 returns to a state status. The printer CPU 110 and the scanner CPU 100 perform serial communication, the printer CPU 110 issues the operation instruction and the scanner CPU 100 returns to the state status.

An operation panel 40 has a liquid crystal display unit 42, various operation keys 43 and a connected panel CPU 41 to be connected to the main CPU 91.

A main control unit 30 is configured by a main CPU 91, a ROM (read only memory) 32, a RAM 33, a NVRAM 34, a sharing RAM 35, an image processing unit 36, a page memory control unit 37, a page memory 38, a printer controller 39 and a printer font ROM 121.

The main CPU 91 entirely manages this copying machine. The ROM 32 stores a control program or the like. The RAM 33 temporally stores the data. An NVRAM (nonvolatile random access memory: NONVOLATILE RAM) 34 is a nonvolatile memory, which is backed up by a battery (not illustrated). Even if an electric power source is shut off, the NVRAM 34 holds the storage data.

The shoring RAM 35 is used to perform the bidirectional communication between the main CPU 91 and the printer CPU 110.

A page memory control unit 37 serves to store the image information in the page memory 38 and read out the image information from the page memory 38. The page memory 38 has an area capable of storing image information for plural pages and is capable of storing the compressed data of the image information transmitted from the color scanner unit 1 by one page.

A printer font ROM 121 stores font data corresponding to the print data. The print controller 39 expands printer data from an outer appliance 122 such as a personal computer or the like into the image data by using the font data stored in the printer font ROM 121 at a resolution in association with the data showing the resolution given to this printer data.

The color scanner unit 1 is configured by a scanner CPU 100 to entirely manage the copying machine, a ROM 101 to store a control program or the like, a RAM 102 for storing data, a CCD driver 103 to drive the above described color image sensor 15, a scanning motor driver 104 to control the rotation of the scanning motor which moves the above described first carriage 8 or the like and an image correcting unit 105, and the like.

The image correcting unit 105 is configured by an A/D converting circuit to convert analog signals of R, G and B outputted from the color image sensor 15 into digital signals, respectively, a shading correcting circuit to correct fluctuation of a threshold level for an output signal from the color image sensor 15 owing to the surrounding temperature change or the like and a line memory to temporally store a digital signal, which is shading-corrected, from a shading correcting circuit, and the like.

A color printer unit 2 is configured by a CPU 110 to entirely manage the copying machine, a ROM 111 to store the control program or the like, a RAM 112 for storing data, a laser driver 113 to drive the above described semiconductor laser oscillator 60, a polygon motor driver 114 to drive the polygon motor 54 of the above described exposure device 50, a feeding control unit 115 to control the deeding of the paper P by the above described feeding mechanism 20, a process control unit 116 to control the process for performing charging, development and transcription by using the above described charging device, the development roller and the transfer printing device, a fixing control unit 117 to control the above described fixing apparatus 80 and an option control unit 118 to control the options, and the like.

Alternatively, the image processing unit 36, the page memory 38, the printer controller 39, the image correcting unit 105 and the laser driver 113 are connected to each other by an image data bus 120.

<Image Processing According to the Present Invention>

Figure 4:
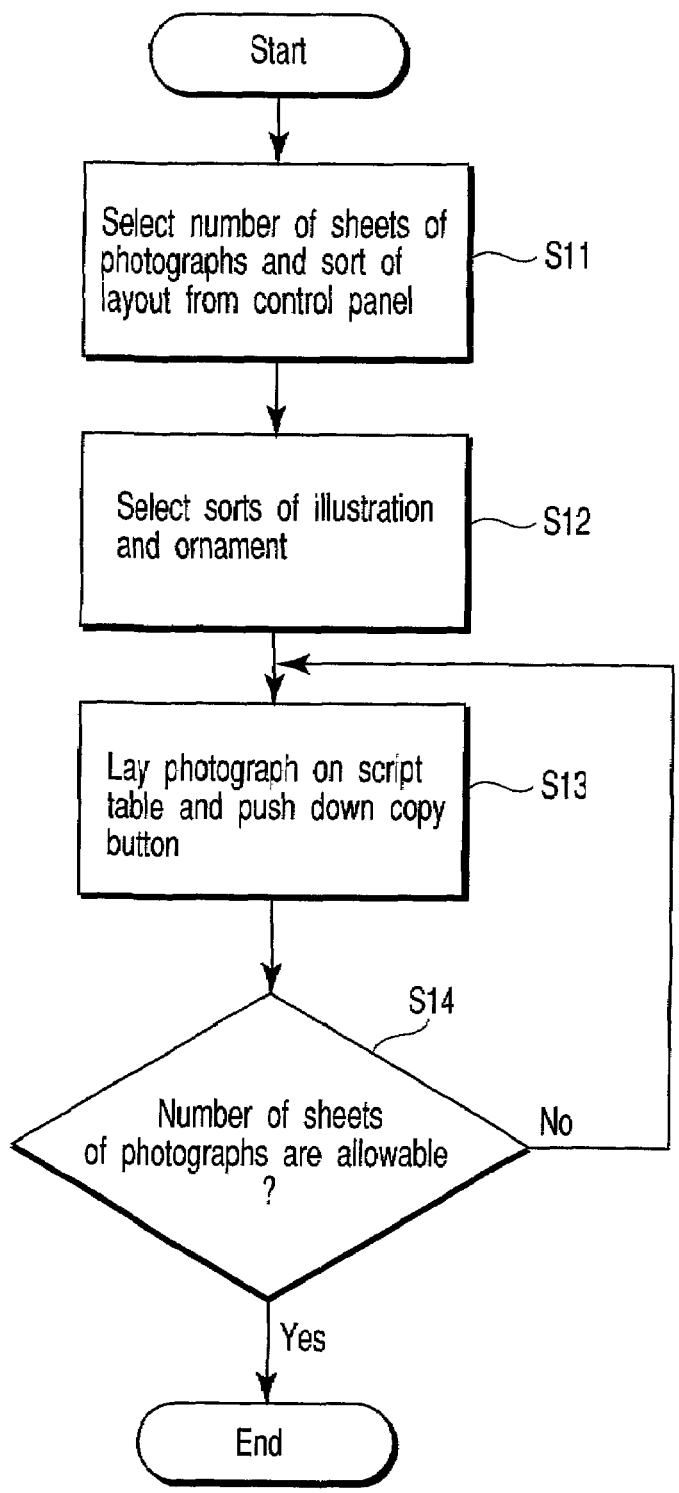
FIG. 4 is a flow chart for explaining a summary of processing according to the present invention.
Figure 5:
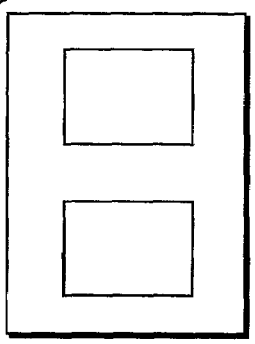
FIG. 5 shows a plurality of examples of a photograph layout according to the processing of the present invention.
Figure 5:
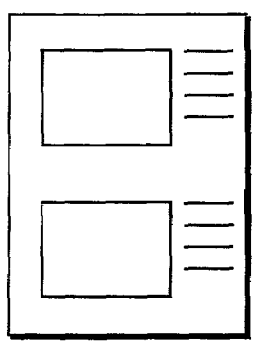
Figure 5:
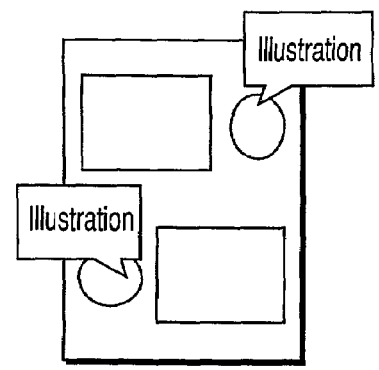
Figure 5:
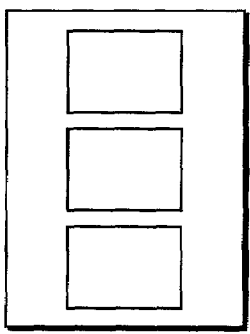
Figure 5:
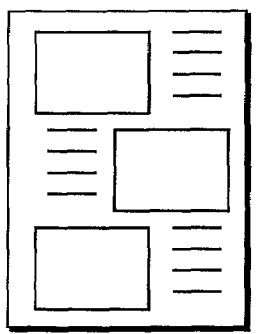
Figure 5:
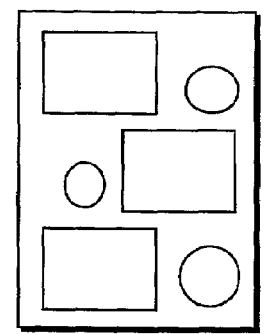
Figure 5:
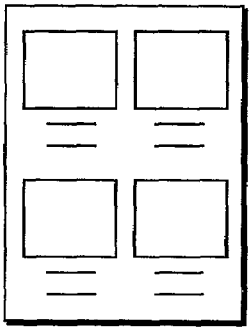
Figure 5:
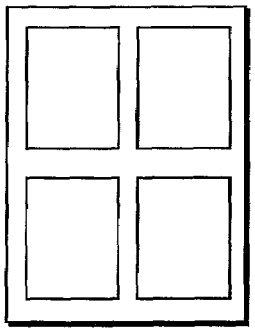
Figure 5:
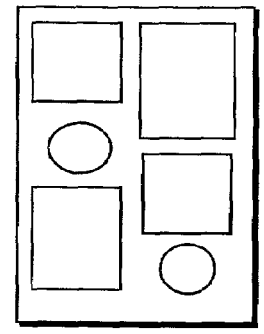
Figure 5:
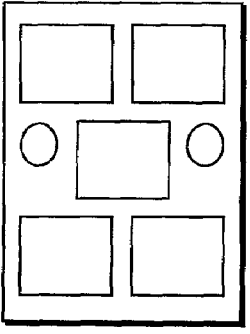
Figure 5:
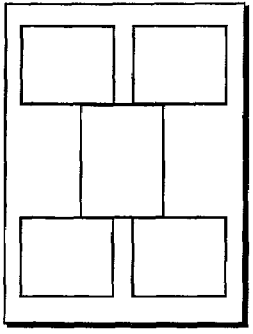
Figure 6:
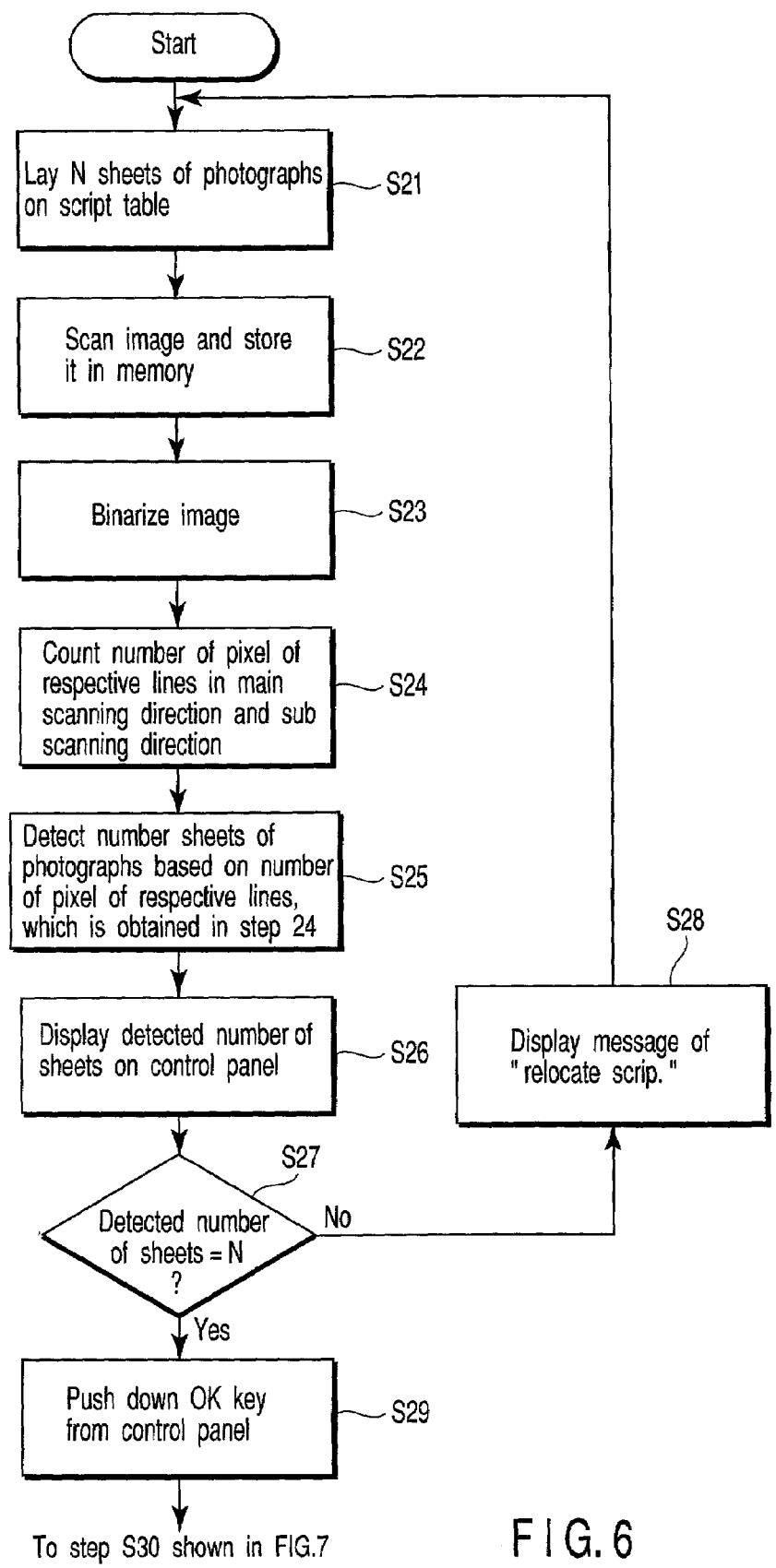
FIG. 6 and FIG. 7 are flow charts for explaining details of the processing according to the present invention.
Figure 7:
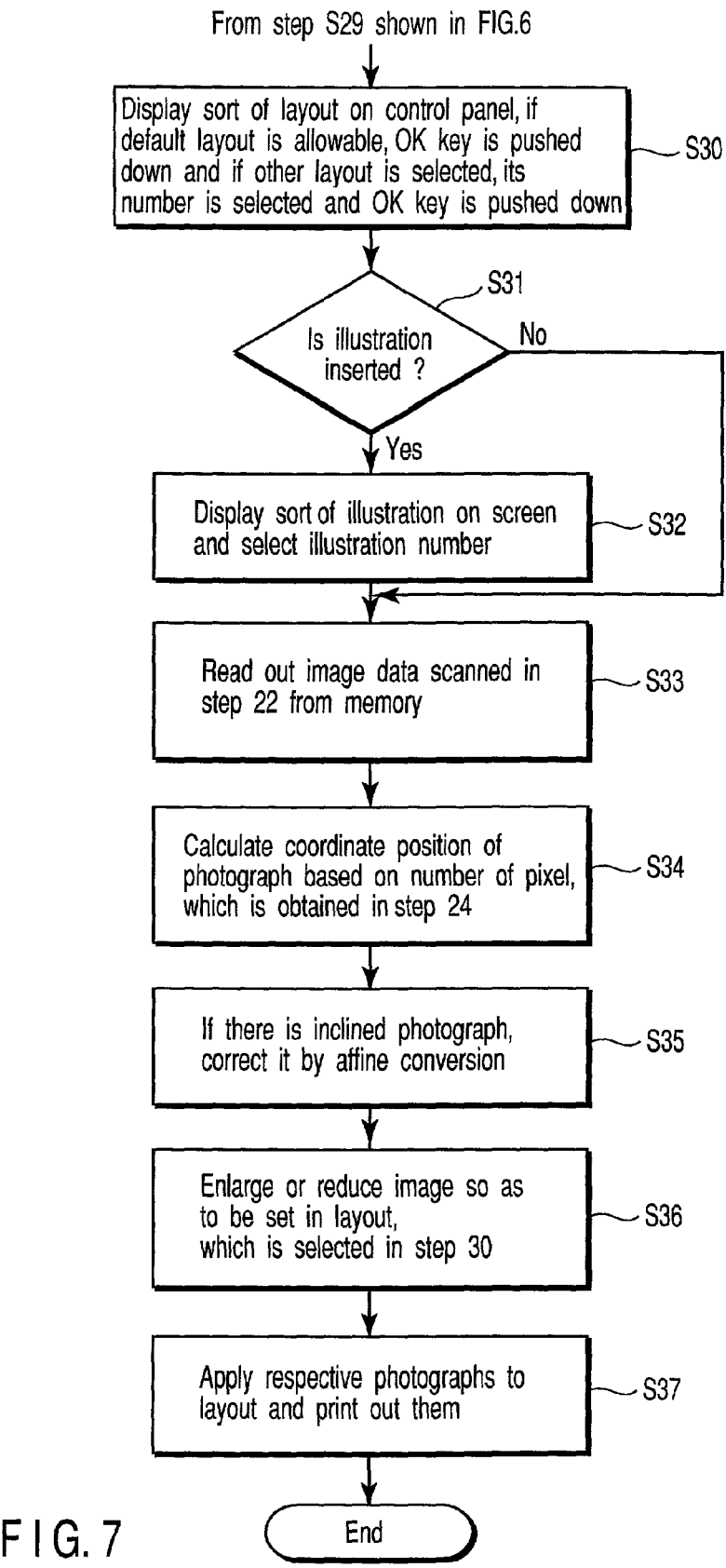

Next, the processing of a photographic image peculiar to the present invention will be described in detail by using the drawings with an emphasis of the image processing unit 36 which is a major part of the present invention cited in the above described image forming apparatus. FIG. 3 is a block diagram for illustrating an embodiment of an image processing unit according to the present invention, FIG. 4 is a flow chart for explaining a summary of the processing according to the present invention, FIG. 5 shows a plurality of examples of a photograph layout according to the processing of the present invention, and FIG. 6 and FIG. 7 are flow charts for explaining details of the processing according to the present invention.

In the image processing of the photographic image according to the present invention, at first, an image whose colors are separated into R, G and B by the scanner unit 1 shown in FIG. 2 is taken in to be temporally stored in the page memory 38. In the next place, various image processings such as filter processing, gradation sequence processing and the like are performed by the image processing unit 36 and the layout information is added from the operation panel unit 40 on the basis of information designated by the user.

FIG. 3 illustrates a structure of the image processing unit 36. The image processing unit 36 has an input processing unit 131 in which the image is inputted from the page memory 38 in which the scanner image is stored, a position/size extracting unit 133 to extract a position coordinate, on which the photograph is laid out, from the output signals transmitted from the input processing unit 131 and further, detect a size of the photographic image, a photograph script processing unit 132 to perform the image processing of an extracted signal portion and an image editing unit 134 to add the layout and illustration information from the operation panel 40 on the basis of the information designated by the user.

Further, the input processing portion 131 has input processing units 135, 136 and 137 of the R, F and B signals, respectively. The photograph script processing unit 132 is configured by a color converting unit 138 to convert the RGB output signals from the input processing portion 131 into cyanogen, magenta, yellow and black (hereinafter, referred to as Y, M, C, K) and a filter processing unit 139 to perform the processing such as enlargement, reduction, removal of a base, removal of a noise, emphasis of an edge and the like to the image signal output from the color converting unit 138. The filter processing unit 139 applies the filter processing to Y, M, C, and K, respectively.

Alternatively, FIG. 4 is a flow chart to explain a summary of the processing from the photograph script is inputted until the layout information is added. In this flow chart, if the instruction of the automatic edit processing of the photographic image in the developing paper photograph mode via the operation panel 40 is received from the user, by displaying in a form of a dialogue, the selection instruction with respect to the number of photographs and the layout is received form the operation panel 40 owing to the user's operation (S11).

Some sorts of the layout information are prepared in association with the number of the photographic images as shown in FIG. 5 as an example. FIG. 5(*a*) illustrates a layout in the case that there are two sheets of the photographs, FIG. 5(*b*) illustrates a layout in the case that there are three sheets of the photographs, FIG. 5(*c*) illustrates a layout in the case that there are four sheets of the photographs, and FIG. 5(*d*) illustrates a layout in the case that there are five sheets of the photographs. Accordingly, if the number of the photographs are designated in advance, the user knows respective layouts as an option from a display.

Next, in the case of providing an illustration and an ornament to the image, the user instructs that the illustration and the ornament should be provided to the image, and further, the user selects the sorts of the illustration and the ornament from the operation panel 40 in the same way (S12). Then, any sheets of the photograph scripts are laid out on the script table and a copy start button is pressed (S13). In the case that the number of sheets of the photograph scripts is different from the designated number, the user displays a message to inform that the number sheets of the photograph scripts is different from the designated number on the operation panel 40. Then, after resetting the script or the like, the user pushes the copy button again.

According to such a method, since automatically acknowledge a position and a size of the photographic image, enlarge/reduce the photograph and processes the photographic image in a predetermined layout, it becomes possible to easily copy the photographs without being careful about how to lay the script and a position where the script is laid. Alternatively, it is possible that not only the photographs are laid out but also the illustration is added to space or the ornamental frame is provided to the photograph, so that a simple photo album is capable of being produced even if the user cuts the photographs by hand.

In the next place, the detailed processing of the above described image processing unit 36 will be explained with reference to flow charts shown in FIGS. 6 to 8 from point to point.

If the instruction to automatically edit the photographic image in a developing paper photograph mode is received via the operation panel 40 from the user, the instruction is displayed in a dialogue format and the instruction to select the number of the photographs and the layout is received from the operation panel 40 by the user's operation (S11). Then, if the N sheets of the photographs are laid out on the script table by the user's operation (S21), the image is scanned to be stored in a memory 38 owing that the user pushes down a start switch (S22). This image is binarized (S23) and the number of pixel of respective lines in a main scanning direction and a sub scanning direction is counted (S24). On the basis of the number of pixel of respective lines, which is determined here, the number of sheets of the photographs is detected (S25). Then, the number of sheets of the photographs is displayed on a control panel (S26). If the number of sheets thereof is not N as the user instructs, a message like "Relocate the scrip." or the like is displayed, so that these processings will be repeated until the number of sheets is recognized as an allowable number of sheets (S28).

In this case, if the number of sheets becomes N as is instructed in advance, the operation panel 40 displays the sorts of the layout as shown in FIG. 5 (S30). If a default layout is allowable, an OK key is pushed down and if other layout is selected, its number or the like is selected and further, the OK key is pushed down.

Further, the user is asked whether the illustration is displayed on the screen or not via the operation panel 40 (S31). If the illustration is displayed on the screen, the screen of the operation panel 40 displays the sorts of the illustration to select the number of the illustration, so that the images selected upon the composite processing to be described later are combined (S32).

Next, the photographic image stored in the memory 38 is read out (S33). Then, on the basis of the number of pixel obtained in the step S24, a coordinate position of the photograph is calculated by the position/size extracting unit 133 (S34). Further, if the inclined photographic image is detected and it is found that this image exists, the image editing unit 134 corrects the inclination by using, for example, an affine conversion or the like (S35).

Then, in the image editing unit 134, referring to a positional coordinate and a size of respective photographic images detected in advance, respective photographic images are enlarged or reduced if necessary so that these photographic images are set in the layout selected by the user in the step S30 (S36). Therefore, the edit image according to the selected layout can be obtained. Then, the edit image is transferred to the color printer unit 2, a plurality of photographic images are formed on the image forming medium by the color images.

As described above, the present invention relates to processing in a developing paper photographic mode of a digital full color copying machine and the present invention provides an image forming apparatus to provide a plurality of photographic images, in which a good layout having a good picture quality and a good appearance.

In other words, according to a conventional developing paper photograph mode, upon copying the developing paper photograph such as a snapshot or the like, the photograph is simply laid out on the script table to be copied, or if the photograph is a standard size, it is enlarged to a size of an output paper by a standard variable power to be copied. The image forming apparatus according to the present invention is capable of solving a layout problem occurred in the case of copying a snapshot and a photograph in an infinite form according to this method such that the layout of the photographs is monotonous or unnatural spaces are produced, so that the copied photographs look sluggish, a problem of complicated works such that, in the case of producing a photo album by using the copied photograph, it is needed that the outputted copy samples are cut by hand to be relocated and an illustration and an ornament are added in order to make a fine show of the photographs, and further, a problem such that an image quality is deteriorated due to plural times of copying accompanied by these works or the like.

In other words, according to the image processing apparatus, the image forming apparatus, the image processing method, and the image forming method, a size and a position of the photographs laid out on the script table are automatically detected in an automatic edit mode and the user automatically corrects the layout in accordance with the layout information selected from some sorts of patterns by the user, so that the user is not burdened with the location of the photographs and how to lay the photographs. Further, according to the image processing apparatus, the illustration information and the ornamental frame are capable of being added, so that it is possible that a simple photo album or the like is easily produced without deterioration of a picture quality due to plural times of copying.

What is claimed is:

1. An image forming apparatus comprising:
   an operation panel which receives instruction to automatic edit processing of a plurality of photographic images;
   a scanner unit which scans said plurality of photographic images and which outputs image information in accordance with the instruction of the automatic edit processing of said operation panel;
   an extracting unit which extracts a position and a size of each of said plurality of photographic images on the basis of the image information output from said scanner unit in accordance with the instruction of said automatic edit processing;
   an image editing unit which outputs an edit image, in which said plurality of photographic images are laid out within a predetermined layout, on the basis of the position and the size of each of said plurality of photographic images detected by said extracting unit in accordance with the instruction of said automatic edit processing; and
   a printer unit which is provided with the edit image from said image editing unit and which forms an image on an image forming medium on the basis of the supplied edit image,
   wherein said image editing unit enlarges or reduces the image information of said photographic image in accordance with said predetermined layout,
   wherein said image editing unit enlarges or reduces the image information of said photographic image in association with the layout selected and designated by said operation panel,
   wherein said image editing unit adds image information of an illustration in addition to the image information of said photographic image and which outputs the edit image, in which said plurality of photographic images are laid out within the predetermined layout, and
   wherein said image editing unit automatically detects inclination of the image information of said plurality of photographic images to correct the inclination.

2. An image forming apparatus according to claim 1, wherein the inclination is adjusted using an affine conversion.

3. An image forming method comprising:
   an instructing step which receives instruction of automatic edit processing of a plurality of photographic images;
   a scan step which scans said plurality of photographic images and which outputs image information in accordance with the instruction of the automatic edit processing at said instructing step;
   an extracting step which extracts a position and a size of each of said plurality of photographic images on the basis of the image information output at said scan step in accordance with the instruction of said automatic edit processing;
   an image editing step which outputs an edit image, in which plurality of photographic images are laid out within a predetermined layout, on the basis of the position and the size of each of said plurality of photographic images detected at said extracting step in accordance with the instruction of said automatic edit processing; and
   a printing step which is supplied the edit image from said image editing step and forms the image on the image forming medium on the basis of the supplied edit image,
   wherein said image editing step enlarges or reduces the image information of said photographic image in accordance with said predetermined layout,
   wherein said image editing step enlarges or reduces the image information of said photographic image with associating the image information of said photographic image with the layout selected and designated at said instructing step,
   wherein said image editing step adds image information of an illustration in addition to the image information of said photographic image and which outputs the edit image, in which said plurality of photographic images are laid out within the predetermined layout, and
   wherein said image editing step automatically detects inclination of the image information of said plurality of photographic images to correct the inclination.

4. An image forming method according to claim 3, wherein the inclination is adjusted using an affine conversion.

* * * * *